W. L. HAMILTON.
RECIPROCATING GEAR MECHANISM.
APPLICATION FILED DEC. 24, 1909.
955,331.  Patented Apr. 19, 1910.
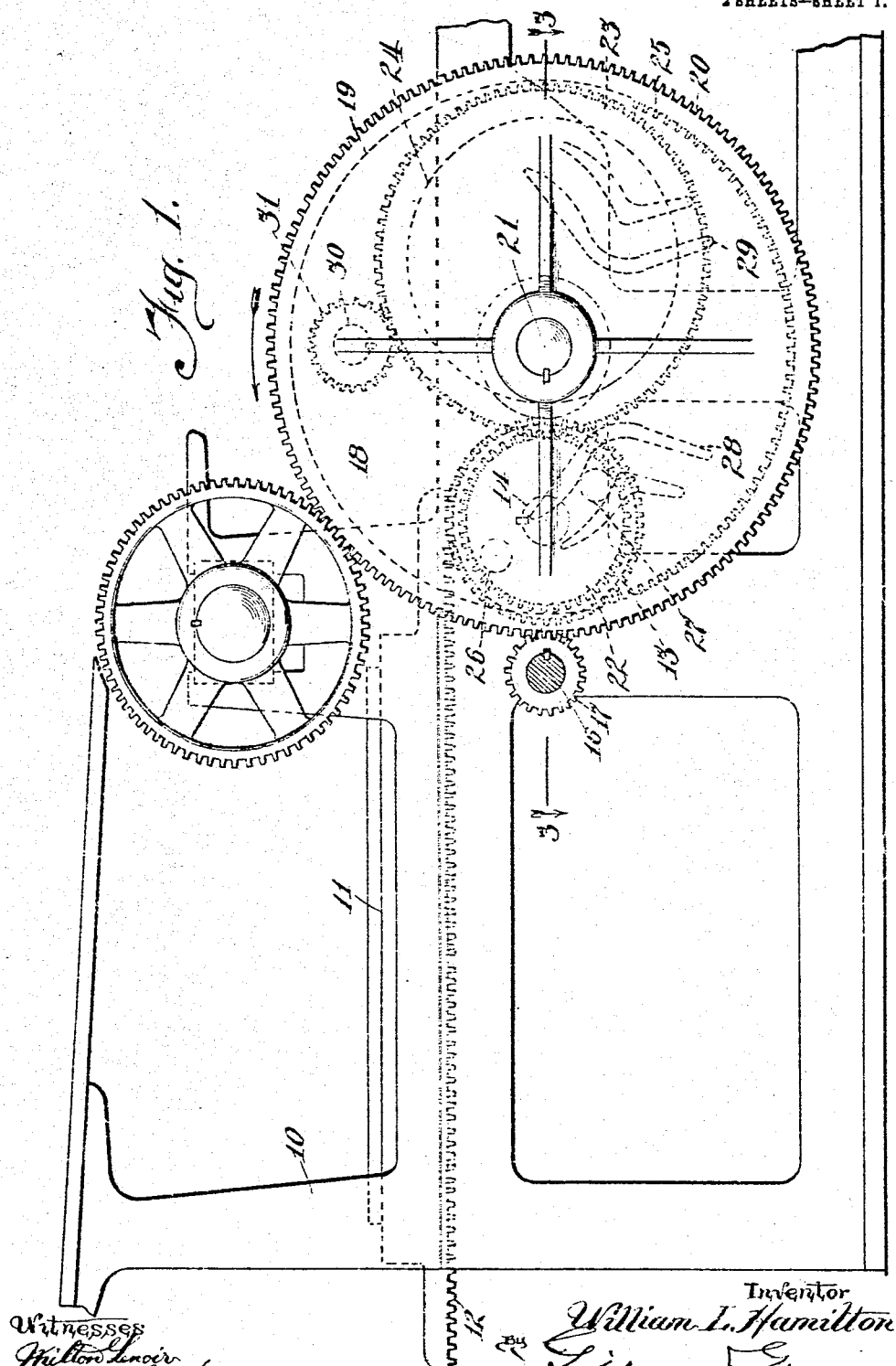

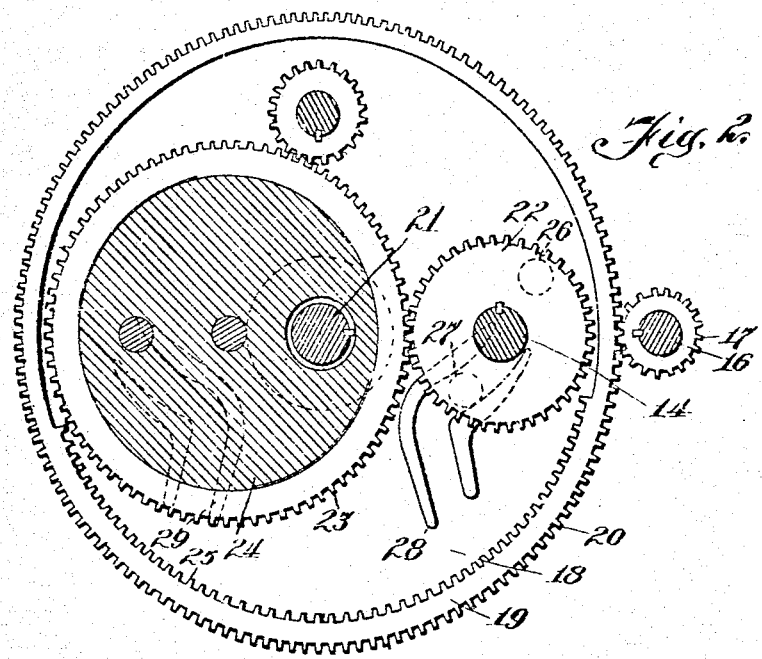
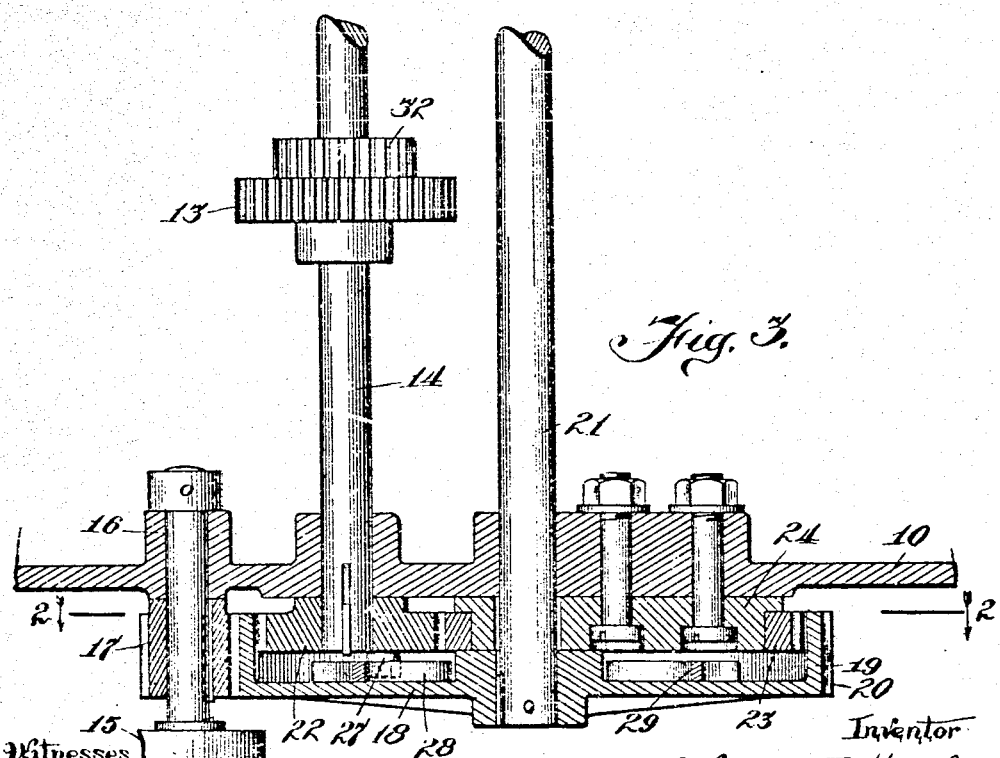

UNITED STATES PATENT OFFICE.

WILLIAM L. HAMILTON, OF CHICAGO, ILLINOIS.

RECIPROCATING GEAR MECHANISM.

955,331.   Specification of Letters Patent.   Patented Apr. 19, 1910.

Application filed December 24, 1909. Serial No. 534,874.

*To all whom it may concern:*

Be it known that I, WILLIAM L. HAMILTON, a citizen of the United States, and resident of Chicago, county of Cook, and State of Illinois, have invented certain new and useful Improvements in Reciprocating Gear Mechanism, of which the following is a specification and which are illustrated in the accompanying drawings, forming a part thereof.

The invention relates to gear mechanism for converting rotary movement into reciprocating movement, and has for its object to provide a reciprocating gear mechanism of improved form, wherein the reciprocating part is driven at the same speed in both directions.

The invention is exemplified in the structure to be hereinafter described and illustrated in the accompanying drawings, wherein—

Figure 1 is a detail side elevation of a cylinder printing press having the invention applied thereto; Fig. 2 is an inside face view of certain of the gears illustrated in Fig. 1 taken on the line 2—2 of Fig. 3; and Fig. 3 is a plan sectional view taken on the line 3—3 of Fig. 1.

The frame of a cylinder printing press is generally designated by the numeral 10 in the drawings. The bed of the press is represented at 11. As is usual in devices of this kind, the bed 11 has a longitudinal reciprocating movement in the frame 10, and is driven by an intermeshing gear rack 12, and pinion 13, mounted respectively upon the underside of the bed 11 and on a shaft 14, which extends transversely through the frame 10, below the bed. Power is applied to a belt pulley 15 which rotates upon a short shaft 16 mounted in the frame 10 adjacent one of its sides. For transmitting power to the other parts of the machine, the belt pulley 15, as shown, has a pinion 17 formed on its hub.

The invention as applied to the printing press illustrated, is employed for converting the continuous rotary movement of the belt pulley 15 and pinion 17 into reciprocating movement in the shaft 14, and bed 11. A gear plate 18 having a flange 19 provided with outwardly facing gear teeth 20, meshes with and is driven by the pinion 17. As shown, the gear plate 18 is mounted upon the end of a shaft 21, which extends through the frame 10 of the machine parallel with the shaft 14. Preferably the gear plate 18 covers the end of the shaft 14 and a pinion 22 mounted thereon. A gear ring 23 also covered by the gear plate 18, encircles the shaft 21 and meshes with the pinion 22. As shown, a bearing 24 for the gear ring 23 is formed upon the side of the frame 10, and the gear ring is held to its seat thereon by the hub of the gear plate 18.

An inwardly facing gear segment 25 is formed upon the flange 19 of the gear plate 18 and meshes alternately with the pinion 22 and with the gear ring 23. When the gear segment 25 is engaged with the gear ring 23, the pinion 22 and the shaft 14 are driven in the opposite direction to that in which they are turned by direct engagement of the gear segment 25 with the pinion 22, but at the same speed. Preferably, the gear segment 25 is of such length that it becomes disengaged from one of the gear members 22, 23, before it engages the other, and cams are provided for reversing the direction of movement of the pinion 22, when this member and the gear ring 23 are free to turn independently of the gear plate 18.

As shown, reversing cams 28, 29, are mounted on the inner face of the plate 18, and cam shoes which conveniently take the form of pins 26, 27, project from the face of the pinion 22 to coöperate with the reversing cams 28, 29. In the operation of the parts, if the gear plate 18 be turned by the pinion 17 in the direction indicated by the arrow in Fig. 1, the cam 28 will engage the cam shoe 27 to reverse the direction of rotation of the pinion 22 and ring 23 as the gear segment 25 passes out of engagement with the pinion 22, and the cam 29 will engage the cam shoe 26 to reverse the direction of rotation of the pinion 22 and ring 23 as the gear segment 25 passes out of engagement with the gear ring 23.

As the gear ring 23 meshes continuously with the pinion 22, other parts of the machine, which are to be moved in unison with the bed 11, may be conveniently driven from it. In the drawings, a shaft 30 which may extend over the bed for the purpose of driving the inking rollers (not shown), is provided with a pinion 31, which meshes with the gear ring 23. The usual gear 32, half the size of the gear 13 employed for driving the bed 11, is shown mounted on the shaft 14 adjacent the gear 13 for driving the antifriction rollers which support the bed.

I claim as my invention:

1. In combination, a pair of intermeshing gears, a cam shoe carried by one of the said gears, a plate having an inwardly facing gear segment movable about the first-named gears and engageable with them in alternation, and a reversing cam carried by the plate.

2. In combination a pair of intermeshing gears, an inwardly facing circular gear segment movable about the first named gears and engageable with them in alternation, the arrangement being such that the gear segment is not engaged with either of the said gears during a part of the revolution of the segment, and means for reversing the direction of rotation of the first named gears when neither of them is engaged with the gear segment.

3. In combination, a pair of intermeshing gears, a cam shoe mounted on one of the gears, an inwardly facing circular gear segment movable about the first-named gears and engageable with them in alternation, the arrangement being such that the gear segment is not engaged with either of the said gears during a part of the revolution of the segment and a reversing cam engageable with the said cam shoe when the gear segment is out of engagement with the gears.

4. In combination, a pair of intermeshing gears, a continuously rotating plate having an inwardly facing gear segment movable about the first-named gears and engageable with them in alternation, the arrangement being such that the gear segment becomes disengaged from each of said gears before it engages the other, and a pair of reversing cams mounted on the plate and operable in alternation, one of said cams being engaged with one of the first-named gears between each engagement of the gear segment with the said gears.

5. In a printing press, in combination, a power shaft, a bed driving shaft parallel with the power shaft, a pinion on the bed driving shaft, a gear ring encircling the power shaft and meshing with the pinion, a pair of cam shoes on the pinion, a plate fixed to the power shaft and having an inwardly facing gear segment movable about the pinion and the gear ring, and engageable with them in alternation, the arrangement being such that the gear segment becomes disengaged from each of said members before it engages the other, and a pair of reversing cams mounted on the plate and operable upon the cam shoes on the pinion in alternation, one of said cams being engaged with the corresponding cam shoe between each engagement of the gear segment with the first-named gear members.

6. In combination a pair of intermeshing gears, an inwardly facing circular gear segment movable about the first named gears and engageable with them in alternation, the arrangement being such that the gear segment becomes disengaged from each of said gears before it engages the other, and means for reversing the direction of rotation of the first named gears between each engagement of the gear segment with the said gears.

WILLIAM L. HAMILTON.

Witnesses:
CHARLES B. GILLSON,
DAISY F. HUGHES.